United States Patent [19]

Cottringer et al.

[11] Patent Number: 5,514,631
[45] Date of Patent: May 7, 1996

[54] ALUMINA SOL-GEL FIBER

[75] Inventors: Thomas E. Cottringer; Ronald H. van de Merwe; Ralph Bauer, all of Niagara Falls, Canada; Walter A. Yarbrough, State College, Pa.

[73] Assignee: Norton Company, Worcester, Mass.

[21] Appl. No.: 358,323

[22] Filed: Dec. 19, 1994

Related U.S. Application Data

[63] Continuation of Ser. No. 443,552, Nov. 29, 1989, Pat. No. 5,383,945, which is a continuation-in-part of Ser. No. 23,346, Mar. 9, 1987, abandoned, and Ser. No. 323,268, Mar. 15, 1989, abandoned, which is a continuation of Ser. No. 732,973, May 13, 1985, abandoned, which is a continuation-in-part of Ser. No. 620,654, Jun. 14, 1984, abandoned, said Ser. No. 23,246, is a continuation-in-part of Ser. No. 872,349, Jun. 9, 1986, abandoned, which is a division of Ser. No. 662,869, Oct. 19, 1984, Pat. No. 4,623,364, which is a continuation-in-part of Ser. No. 592,689, Mar. 23, 1984, abandoned, which is a continuation-in-part of Ser. No. 572,106, Jan. 19, 1984, abandoned.

[51] Int. Cl.$^6$ .................................... C04B 35/10
[52] U.S. Cl. .................. 501/95; 501/12; 501/127
[58] Field of Search .................. 501/12, 95, 127

[56] References Cited

U.S. PATENT DOCUMENTS

| | | |
|---|---|---|
| 2,947,056 | 8/1960 | Csordas et al. . |
| 2,979,414 | 4/1961 | Rushhewitch et al. . |
| 3,079,243 | 2/1963 | Ueltz . |
| 3,093,498 | 6/1963 | Whittmore . |
| 3,108,888 | 10/1963 | Bugosh . |
| 3,121,623 | 2/1964 | Nesin . |
| 3,141,747 | 7/1964 | Marshall . |
| 3,216,794 | 11/1965 | Roschuk . |
| 3,343,915 | 9/1967 | Rossi et al. . |
| 3,387,957 | 6/1968 | Howard . |
| 3,437,468 | 4/1969 | Seufert . |
| 3,615,306 | 10/1971 | Jones, II et al. . |
| 3,615,308 | 10/1971 | Amero . |
| 3,698,923 | 10/1972 | Stetson et al. . |
| 3,808,015 | 4/1974 | Seufert . |
| 3,853,688 | 12/1974 | D'Ambrosio . |
| 3,909,991 | 10/1975 | Coes, Jr. . |
| 3,940,276 | 2/1976 | Wilson . |
| 3,953,561 | 4/1976 | Shin . |
| 4,204,873 | 5/1980 | Yamamoto et al. . |
| 4,217,113 | 8/1980 | Sieh et al. . |
| 4,252,544 | 2/1981 | Takahashi . |
| 4,314,827 | 2/1982 | Leitheiser . |
| 4,325,710 | 4/1982 | Tanaka et al. . |
| 4,371,627 | 5/1982 | Yamamoto et al. . |
| 4,477,427 | 10/1984 | Matyasi et al. . |
| 4,487,756 | 12/1984 | Mizrah et al. . |
| 4,543,107 | 9/1985 | Rue . |
| 4,568,363 | 2/1986 | Meloon . |
| 4,574,003 | 3/1986 | Gerk . |
| 4,678,762 | 7/1987 | Agarwal/Hay . |
| 4,744,802 | 5/1988 | Schwabel . |
| 4,761,388 | 8/1988 | Dguri et al. ............... 501/95 |
| 4,797,269 | 1/1989 | Bauer . |
| 4,800,685 | 1/1989 | Haynes, Jr. . |
| 4,835,124 | 5/1989 | Pearson . |
| 4,954,462 | 9/1990 | Wood et al. .............. 501/95 |
| 5,185,299 | 2/1993 | Wood et al. .............. 501/95 |
| 5,204,300 | 4/1993 | Kumagi et al. .............. 501/12 X |
| 5,372,620 | 12/1994 | Rowse et al. .............. 501/95 X |

FOREIGN PATENT DOCUMENTS

| | | |
|---|---|---|
| 7902063 | 1/1982 | Brazil . |
| 0168606 | 5/1985 | European Pat. Off. . |
| 2099012 | 12/1982 | United Kingdom . |

OTHER PUBLICATIONS

"Microstructure in Oxides", Sintering and Related Phenomena, N.Y. (1964), T. Vasilos and R. M. Spriggs, pp. 301–327.

"Synthesis of New Solid–State Materials by Ultrahigh Pressure Techniques", Avco Missiles Space and Electronics Group Space Systems Division, (Dec. 20, 1966) A. J. Delai, R. M. Haag and T. Vasilos, pp. 1–41.

"The Hot Pressing of Ceramics", Proc. Bris. Ceram. Soc., (1965) T. Vasilos and R. M. Spriggs, pp. 195–221 (no date).

"Reactive Hot–pressing of Alumina with Additives", American Ceramic Soc. Bulletin, (1969) G. E. Gazza, J. R. Barfield and D. L. Prass, pp. 606–610 (1969).

"Correlation of Hardness with Mechanical Effects in Ceramics", Roy W. Rice, pp. 123–134 (no date).

"Synergetic Presure–Sintering of $Al_2O_3$", Journal of the American Ceramic Society—Discussions and Notes (Feb. 1972), CJP Steiner, R. M. Spriggs and D. P. H. Hasselman, pp. 115–116.

"Some Factors Affecting the Reactive Hot–Pressing Behavior of Alumina", Journal of Materials Science (1973) D. I. Matkin, W. Munro and T. M. Valentine, pp. 1625–1632.

"Optimum Procedures for Determining Ultrafine–Grain Sizes", J. E. Hillard, J. B. Cohen and W. M. Paulson, pp. 73–97 (no date).

"Average Grain Size in Polycrystalline Ceramics", Mel I. Mendelson, pp. 443–446 (Aug. 1969).

"Control of Microstructure and Properties for Corundum Materials", Sklar a Keramik, pp. 79–82 (no date).

"Corumdum Abrasive with Cosrolled Microstructure", Sklar a Keramik, pp. 369–372 (no date).

"Fine–Crystalline, Low Temperature Sintering Alumina Ceramic", G. Riedel, et al., Center for Research and Technology, Research Institute for Electrotechnical Ceramics (1989) no month.

C. P. Shillaber, Photomicrography in Theory and Practice (John Wiley & Sons, 1944), pp. 66–97.

L. Coes, Jr., "Abrasives", (Springer–Verlag, 1971), pp. 41, 44.

W. W. Perkins, Ed., Ceramic Glossary 1984 (American Ceramic Society), p. 6.

(List continued on next page.)

Primary Examiner—Karl Group

[57] ABSTRACT

An alumina based ceramic fiber having submicron sized alpha alumina crystals and a density of at least 95% theoretical is obtained from a sol-gel process.

1 Claim, No Drawings

OTHER PUBLICATIONS

W. A. Neilson, T. A. Knott, P. W. Carhart, Webster's New International Dictionary of the English Language, 2nd Ed. (G. & C. Merriam Co., 1957), (1 page).

"American National Standard for Grading of Certain Abrasive Grain on Coated Abrasive Material", (American National Standards Institute, Jan. 20, 1977), pp. 15–16, 23.

T. S. Yeh, M. D. Sacks, "Low Temperature Sintering of Aluminum Oxide" in J. Am. Ceram Soc., 71 [10] (1988), pp. 8041–8044.

Kirk–Othmer, "Encyclopedia of Chemical Technology", 3rd Ed. (John Wiley & Sons, 1978), vol. 1, pp. 26–30 (1978).

Document entitled "Technical Data Sheet—3M Cubatron—Ceramic Aluminum Oxide" (1 page).

J. B. Wachtman, W. E. Tefft, D. J. Lam, R. P. Stinchfield, "Elastic Constants of Synthetic Single Crystal Corundum at Room Temperature" in J. Res. of the Nat'l Bureau of Standards—A. Physics and Chemistry 64A [3] (May/Jun. 1960), pp. 213–228.

R. C. Weast, M. J. Astle, Eds., "CRC Handbook of Chemistry and Physics", 6th ed. (CRC Press, 1979) p. E–394.

E. Ryshkewitch, D. W. Richerson, "Oxide Ceramics, Physical Chemistry and Technology", 2nd Ed. (Academic Press, 1985), pp. 471–473.

H. P. Klug, L. E. Alexander, "X–Ray Diffraction Procedures for Polycrystalline and Endomorphous Material", (John Wiley & Sons, 1954), pp. 626–633.

B. D. Cullity, "Elements of X–Ray Diffraction", 2nd ed. (Addison–Wesley Pub. Co., 1978), pp. 406–420.

Document entitled "PDF Reference Card #10–173".

M. Kumagai, G. L. Messing, "Enhanced Densificationof Boehmite Sol–Gels by a–Alumina Seeding" in Comm. Am. Ceram. Soc. (Nov. 1984), pp. Q–230–Q–231.

M. M. Ristic, ed., "Sintering—New Developments" (Elsevier Scientific Pub. Co., 1979), pp. 168–177.

R. A. Swalin, "Thermodynamics of Solids", 3rd Printing (John Wiley & Sons, 1964), pp.206–213.

A. W. Searcy, D. V. Ragone, U. Columbo, "Chemical and Mechanical Behavior of Inorganic Materials" (Wiley–Interscience, 1970), pp. 173–179.

W. D. Kingery, H. K. Bowen, D. R. Uhlmann, "Introduction to Ceramics", 2nd Ed. (John Wiley & Sons, 1976), pp. 212–213.

J. D. Birchall, J. A. A. Bradbury, J. Dinwoodie, "Chapter IV—Alumina Fibres: Preparation, Properties and Applications" in Handbook of Composites, ed. W. Watt, B. V. Perov (Elsevier Science Pub. B.V., 1985), pp. 115–154.

F. F. Lange, "Sinterability of Agglomerated Powders" in J. Am. Ceram. Soc. 67 [2] (Feb. 1984), pp. 83–89.

P. V. McAllister, I. B. Cutler, "Thermal Grooving of MgO and $Al_2O_2$" in J. Am. Ceram. Soc. 55 [7] (Jul. 1972), pp. 351–354.

J. C. Bravman, R. M. Anderson, M. L. McDonald, "Specimen Preparation for Transmission Electron Microscopy of Materials" (Materials Resarch Soc., 1988), pp. 161–165, 199–204, 217–222.

W. W. Mullins, "Theory of Thermal Grooving" in J. App. Physics 28 [3], pp. 333–339 (Mar. 1957).

E. M. Levin, C. R. Robbins, H. F. McMurdie, "Phase Diagrams for Ceramists" 3rd Ed. (Am. Ceram. Soc., 1974), p. 110.

W. G. Kingery, H. K. Bowen and D. R. Uhlmann, "Introduction to Ceramics", 2nd Ed. (John Wiley & Sons, 1976), pp. 452–458.

R. M. Fulrath, J. A. Pask, "Ceramic Microstructures—Their Analysis, Significance and Production" (John Wiley & Sons, 1966), pp. 666–689.

C. S. Barrett, T. B. Massalski, "Structure of Metals—Crystallographic Methods, Principles, and Data", 3rd Ed., in the Materials Science and Engineering Series (McGraw–Hill Book Co., 1966), pp. vii–viii—Preface, pp. ix–xvii—Table of Contents, and pp. 380–417—Chapter 14: Defects in Crystals.

Modrzejewski, Szarras, Ziubinski, "Study of Low Angle Boundries in Large Crystals of Nickel and of Iron Alloys with Nickel or Cobalt", J. of Crystal Growth 3 [4] (1968), pp. 716–718.

R. A. Shelleman, G. L. Messing, M. Kumagai, "Alpha Alumina Transformation in Seeded Boehmite Gels" in J. Non–Crystalline Solids 82 (1986), pp. 277–285.

W. A. Yarbrough, R. Roy, "Microstructural Evolution in Sintering of ALOON Gels" in J. Mater. Res. 2 [4] (Jul./Aug. 1987), pp. 494–515.

L. Pach, R. Roy, S. Komarneni, "Nucleation of Alpha Alumina in Boehmite Gel" in J. Mater. Res. 5 [2] (Feb. 1990), pp. 278–285.

D. Tabor, "Indentation Hardness and Its Measurement: Some Cautionary Comments" in Microindentation Techniques in Materials Science, pp. 129–159 (1986).

Z. Li, A. Ghosh, A. S. Kobayashi, R. C. Bradt, "Indentation Fracture Toughness of Sintered Silicon Carbide in the Palmqvist Crack Regime", J. Am. Ceram. Soc. 72 [6] (Jun. 1989), 904–11.

S. Chandrasekar, K. Kokini, B. Bhushan, "The Effect of Abrasive Properties on Surface Finishing Damage in Ceramics" (1988), pp. 33–46.

D. B. Marshall, B. R. Lawn, "Indentation of Brittle Materials" in Microindentation Techniques in Materials Science (ASTM STP 889, 1986), pp. 26–46.

H. C. Dunegan, "Notes on Hardness Measurements of Polycrystalline Materials" in Mechanical Properties of Engineering Ceramics, ed. W. W. Kriegel, H. Palmour III (Interscience Publishers, 1961), pp. 521–537.

G. Maczura, T. L. Francis, R. E. Roesel, "Special Aluminas for Ceramics and Other Industrial Applications" reprinted from Interceram 3 (1976).

R. Ryshkewitch, Oxide Ceramics (Academic Press, 1960), pp. vii–viii—Table of Contents, and pp. 192–194.

S. Okada and K. Kuwashima, "Study of Alumina as Raw Material for Artificial Genes (Thermal Decomposition Process of Alums)", Jrnl of Ind. Chem., vol. 59, No. 11 (1956), pp. 1301–1304.

F. W. Dynys and J. W. Halloran, "Alpha Alumina Formation in $Al_2O_3$ Gels", J. Wiley & Sons, Inc. (1984).

F. W. Dynys and J. W. Halloran, "Alpha Alumina Formation in Alum–Derived Gamma Alumina" Journal of the American Ceramics Society, vol. 65, No. 9, p. 442.

G. C. Bye and G. T. Simpkin, "Influence of Cr and Fe on Formation of $\alpha$–$Al_2O_3$ from $\Sigma$–$Al_2O_3$", Journal of the American Ceramics Society, vol. 57, No. 8, pp. 367–371.

R. A. Shelleman, G. L. Messing, M. Kumagai, "Alpha Alumina Transformation in Seeded Boehmite Gels" in J. of Non–Crystalline Solids 82 (1986), pp. xiii and 277–85.

G. Yamaguchi and H. Yanagida, "Corundum $\alpha$–$Al_2O_3$ Formation from the Dehydration of Boehmite $\tau$A100H under Hydrothermal Conditions. I. Factors Determining the Grain Size of Corundum and a Proposal for the Formation Mechanism", (Sep., 1963) in Factors Determining the Grain Size of corundum, pp. 1155–1158.

H. Yanagida and G. Yamaguchi, "A Discussion on the Phase Diagram of the System $Al_2O_3$–$H_2O$ Considering the Transformation Mechanism of the Polymorphs Appearing in It", pp. 48–53.Y. Wakao and T. Hibino, "Effects of Metallic Oxides on α—Transformation of Alumina" in Nagoya Kogyo Gijutsu Shinkensho Hokoku, vol. 11, No. 9 (1962), pp. 588–595.

T. Tsuchida et al., "The Effect of $CR^{3+}$ and $Fe^{3+}$ Ions on the Transformation of Different Aluminum Hydroxides to α–$Al_2O_3$, Thermochimica Acta, 64 (1983), pp. 337–353[4].

Proceeding of the British Ceramic Society, Jan. 1970, pp. 69–83 by Blakelock et al.[1].

L. L. Hench, D. R. Ulrich, Science of Ceramic Chemical Processing (John Wiley & Sons, 1986), pp. xv–xxi: Table of Contents.

C. J. Brinker, D. E. Clark, D. R. Ulrich, eds., "Better Ceramics Through Chemistry II" (Materials Research Society, 1986), pp. ix–xv: Table of Contents.

W. A. Yarbrough, R. Roy "Microstructrual Evolution in Sintering of ALOOH Gels" in J. Mater. Res. 2 [4] (Jul./Aug. 1987), pp. 494–515.

J. C. Romine, "New High–Temperature Ceramic Fiber" in Ceram. Engg.and Science Proceedings (Jul./Aug. 1987), pp.755–765.

J. K. Mackenzie, "The Elastic Constants of a Solid Containing Spherical Holes," pp. 2–11 (Aug. 4, 1979).

W. G. Kingery, H. K. Bowen, D. R. Uhlmann, Introduction to Ceramics, 2nd Ed. (John Wiley & Sons, 1976), pp. vii–xii: Table of Contents, and p. 776.

A. K. Dhingra, "Alumina Fibre FP" in Phil. Trans. R. Soc. Lond. A 294 (1980), pp. 411–417.

J. F. Hack, G. C. Strempek, Final Report CR–159517, Contract NAS3–21371 (Jun. 1980).

J. Nunes, "Tensile Property Evaluation of Polycrystalline Alumina Filaments and their Composites" in Composites Tech. Rev. 5 [2] (Summer 1983), pp. 53–60.

C.–T.Li, N. R. Langley, "Improvement in Fiber Testing of High–Modular Single–Filament Materials" in Communications of Am. Ceram. Soc. 68 [8] (Aug. 1985), pp. C–202–C–204.

ALUMINA SOL-GEL FIBER

This application is a continuation of application Ser. No. 07/443,552 filed on Nov. 29, 1989 now U.S. Pat. No. 5,383,945, which is a continuation-in-part of application Ser. No. 023,346, filed Mar. 9, 1987, now abandoned and of application Ser. No. 323,268 filed Mar. 15, 1989, now abandoned, application Ser. No. 023,346 is a continuation-in-part of application Ser. No. 872,349 filed Jun. 9, 1986, now abandoned, which was a division of application Ser. No. 662,869 filed Oct. 19, 1984, now U.S. Pat. No. 4,623,364, application Ser. No. 662,869 was a continuation-in-part of application Ser. No. 592,689, filed Mar. 23, 1984, now abandoned, which was a continuation-in-part of our application Ser. No. 572,106, filed Jan. 19, 1984, now abandoned, application Ser. No. 323,268 is a continuation of application Ser. No. 732,973 filed May 13, 1985, now abandoned, which is a continuation-in-part of application Ser. No. 620,654, filed Jun. 14, 1984, now abandoned.

FIELD OF THE INVENTION

The invention relates to the production of aluminous abrasive grits or shaped bodies containing high density polycrystalline alpha alumina, or such alumina with other additives.

BACKGROUND OF THE INVENTION

Hard and strong abrasive grits, for use in grinding wheels, flexible coated abrasive products ("sandpaper"), or as loose abrasive, are produced commercially from alumina containing raw materials either by fusion in an electric furnace or by the firing of shaped bodies containing finely divided alumina at temperatures well below the fusion points of the material. Such lower temperature process is called sintering. This invention relates to polycrystalline aluminous abrasives and other bodies made by the sintering process.

The first large-scale commercially produced sintered abrasives were produced by the method taught in U.S. Pat. No. 3,079,243 to Ueltz. This patent teaches the milling of calcined bauxite to produce a fine particle size raw material which is then formed into abrasive grit sized particles and fired at about 1500° C. to form hard, strong, tough, pellets of polycrystalline alumina.

Recently, abrasive materials consisting of grits made up of alumina and magnesia spinel, presumably made according to the teachings of U.S. Pat. No. 4,314,827, and made according to the teaching of published British Application 2,099,012A, published Dec. 1, 1982, have been commercially introduced. These materials are produced by the sintering (at about 1400° C.) of dried alumina gel particles. U.S. Pat. No. 3,108,888 to Bugosh also teaches making high density alumina (or alumina containing) products by firing a dried alumina gel made from alpha alumina monohydrate (boehmite) or by hot pressing dried powders made from such gels.

Alumina/magnesia-spinel commercial abrasives made from gels contain alumina in the form of cells from 5 to 15 microns in diameter. The cells, or "sunbursts", are made up of many elongated alumina arms 0.2 to 0.4 micrometers in diameter (but some of which can be as large as 1 micrometer in the form of very roughly spherical "blobs"). The arms in each cell appearing generally to radiate from the center of the cell. All of the arms in a given cell are apparently crystallographically identically oriented. Such orientation is shown by the fact all the area of a given cell extinguishes simultaneously upon sample rotation when viewed between crossed polarizers by transmitted light microscopy.

While the commercial abrasives made from sintered gels containing alumina and magnesia are high quality abrasives, it has not been possible to produce high purity alumina grits by the gel route. This is shown by the relative softness and lack of abrasive utility for the "control" example 13 in U.S. Pat. No. 4,314,827 which was made from an alumina gel without metal oxide or metal salt additions.

The present invention is an improvement in the art of making strong alumina bodies whereby useful abrasive products or other ceramic products can be made from alumina gel with or without the addition of zirconia or spinel formers such as magnesia.

DISCLOSURE OF THE INVENTION

The invention resides in the discovery that control of the microstructure of the fired product, such that the cellular structure of the alumina in the prior art abrasives is avoided, results in improved product performance. The resulting product, instead of cell areas of 5 to 10 micrometers in diameter, contains alpha alumina particles (crystallites) of submicron size, typically averaging 0.05 to 0.8 micrometers or higher, depending upon the firing conditions, the lower the firing, the finer the size.

In the case of the higher MgO additions (e.g. in some cases 5%) these alumina particles are surrounded by a matrix of spinel.

Conditioning of the gel to achieve the described effect can be achieved by vibratory milling of the mix in the sol or diluted gel form while employing alumina bodies as the grinding medium in the mill. The main effect of the milling is to introduce material from the alumina grinding media into the alumina gel which then acts as a seed. Also impurities such as zinc and iron are introduced from the piping and associated equipment. Milling with zirconia bodies, for example, is ineffective to produce the desired essentially non-cellular structure because zirconia is not an effective seed for alpha alumina crystallization.

The first effective and reproducible method found by us was to generate such material in the gel by vibratory milling of the gel with alumina bodies. A suitable vibratory mill is shown in U.S. Pat. No. 3,100,088. Typically the media may be ½ inch in diameter and ½ to ¾ inches long. The tub which contains the media and the mix is vibrated in the horizontal plane by an off-balance weight connected to the shaft of a motor mounted coaxially with the tub which is mounted on springs. The off-balance weight is mounted adjacent the plane of the bottom of the tub and a second weight is mounted below it. The motor typically rotates at 1200 rpm. The combined oscillation subjects the contents to a milling action by the grinding media. The interior surface of the mill is preferably lined, as with rubber, to prevent contamination by erosion of the metal walls.

Various additives such as taught in U.S. Pat. No. 4,314,827 and British Application 2,099,012A can be added to the alumina before or after gelling. The most useful additive presently known is any compatible precursor of MgO, whereby the final product contains preferably around 5% MgO. The MgO is present, however, in the product as spinel (magnesium aluminate: $MgAl_2O_4$) but calculated as MgO in the analysis. Obviously lesser amounts of MgO may be included since the alumina with no addition is an excellent abrasive in its own right when produced according to the present invention. The milled gel of the present invention may serve as a matrix for various added materials or abrasive particles.

The milled mix may be simply poured or placed into containers to dry and then broken up into appropriate sized pieces by crushing, with undersized material recycled to the beginning of the process. Alternatively, the material may be formed or molded into shaped particles or other bodies as by extrusion. In the case of extrusion, the rods formed would later be cut or broken into appropriately sized pieces if abrasive products are desired. The minimum useful firing temperature is significantly below 1200° C., usually considered the transformation point to convert to alpha alumina. The upper limit is not critical so long as the fusion temperature is not reached and excessive growth is not produced. Too long a firing or too high a temperature can cause excessive crystal growth, however. Higher temperatures also increase the cost of the process, so the preferred firing range is 1200° to less than 1500° C. As indicated below, however, temperatures as low as 1090° C. may be employed.

EXAMPLE I

In a large polymeric plastic mixing vessel 30 pounds (13.6 Kg) of Condea SB Pural Alumina (supplied by Condea) and 30 Imperial gallons (136 liters) of water were mixed. This material was then gelled by adding 4.1 liters of 14 weight % $HNO_3$. Magnesium nitrate hydrate (7.5 pounds, or 3.4 kg) dissolved in 3 gallons (13.7 liters) of water was then added to the alumina gel to give 5% by weight of MgO in the final product. It was mixed for 15 minutes and transferred to a Model M451 Sweco mill and milled for 1 hour with 1700 pounds of alumina media. The mix was recirculated through the mill for the one hour milling time at a rate of about four gallons per minute. After milling it was pumped into aluminum trays to a thickness of about 3 inches (7.6 cm) for drying on electric strip dryers.

The alumina media composition was about 90% alpha alumina with silica as the main impurity.

A series of batches according to the above formulation were made up and combined for crushing and firing.

The dried gel was then roll crushed and screened to a through 14 mesh sizing before firing, to yield the desired final grit sizes. It was then prefired at 400° C. for 16 hours and fired at 1400° C. for 30 minutes in a rotary kiln.

After firing all of the products had a hardness of 19 GPa (Vickers indenter, 500 g load) and a very fine microstructure in which there was no cellular microstructure and, almost all of the alpha alumina was in the form of generally equiaxed particles (crystallites), 0.2 to 0.4 microns in diameter, except for rare square blocky shapes about 5 microns in diameter. The blocky shapes may have indicated contamination. The product, upon examination by the scanning electron microscope, was seen to be comprised of a spinel matrix and a discontinuous phase of alpha alumina.

In some specific coated abrasive grinding applications the material was superior to fused alumina-zirconia and superior to commercially available sintered gel type abrasive of the alumina-spinel composition.

EXAMPLE II

Pural microcrystalline boehmite alumina, 22.7 kilograms, was mixed with 225 liters of water and 13.5 liters of 14% $HNO_3$ for 10 to 15 minutes.

One half of the gel mixture was milled for 2 hours in the Sweco mill containing ½x½ inch ceramic bonded alumina, 88 $Al_2O_3$ (the main impurities being MgO 1.74%, $SiO_2$ 8.9%, $Fe_2O_3$ 0.18%, $TiO_2$ 0.2%, CaO 0.8%, $Na_2O$ 0.34%), available from Coors Porcelain Co., and dried. This was the same media as used in Example I. The other half was simply dried without milling. The dried gels were crushed to size, prefired at 450° C. for 16 hours and fired at 1400° C. for 1 hour.

The milled material had a hardness of 19.1 GPa, the unmilled material had a hardness of 11.0 GPa.

Material from each batch was screened to produce 50 grit abrasive grains which were then used to produce vulcanized fiber backed coated abrasive discs. The milled material outperformed commercial alumina zirconia abrasive by better than 10% in grinding 1020 steel (the test showed a 14% higher metal removal).

The unmilled product was inferior to fused abrasive in all grinding tests, which was to be expected in view of its low hardness.

EXAMPLE III

In an example similar to that of the milled product of Example I, the gel was milled for 0.2 hours. The product, fired at 1400° C. for one hour, was mainly of the fine random 0.2 to 0.3 micrometer crystal structure, but showed some cellular appearance.

EXAMPLES IV TO IX

Further examples were performed in a study of the effect of firing time at 1400° C. All samples were made by the general procedure of Example I. Condea microcrystalline boehmite alumina was employed, milling was for two hours, but after drying, the gels were prefired at 750° C. for 30 minutes. As the firing time was increased, there began to appear in the product a coarse lath shaped crystallization of alumina, randomly dispersed among the fine 0.2 to 0.4 micrometer alumina particles.

The results are tabulated as follows:

| Firing Time (minutes) | Particle Size (Micrometers) | | % Ratio Coarse/Coarse and Fine |
|---|---|---|---|
| | Coarse | Fine | |
| 1 | None | 0.2–0.3 | 0 |
| 3 | 1.0–2.0 | 0.2–0.3 | 5 |
| 5 | 2–5 | 0.2–0.3 | 20 |
| 10 | 4–8 | 0.2–0.3 | 50 |
| 30 | Up to 8 | 0.2–0.3 | 80 |
| 60 | Up to 8 | 0.2–0.3 | 95 |

Since the presence of the coarse fraction is believed to be less desireable, the firing time at 1400° C. should not be more than 5 minutes for the preferred product when the material is prefired at 750° C. for 30 minutes.

In all cases, no cellular structure was observed. The microstructures consisted of the non-faceted submicron particles and the faceted lath-like coarse crystals, except in the case of the 1 minute firing where no laths were found.

By "non-faceted" we mean no regular faceting of the crystallites was observed in a fractured surface at 5,000X magnification by the scanning electron microscope. The particles of alpha alumina wire, instead, rather formless, apparent straight outlines. At 20,000X magnification faceted structure begins to be clearly apparent.

The abrasive grits of this invention have a hardness measured by the, Vickers indenter with a 500 gram load of at least 16 GPa (90% density) for alumina without additions and at least 14 GPa for the grits which are modified by the presence of 2% or more of spinel formers or are modified by other additives. While pure dense alpha alumina has a hardness of about 20–21 GPa, some porosity may be desireable or acceptable for certain applications which would lower the hardness. When the alumina has a hardness of 13 GPa or less, it is too porous for most abrasive purposes. Preferred are hardnesses of 18 GPa or higher as measured by the Vickers indenter at a 500 g load, when the material is to be used as an abrasive. Low firing, resulting in crystal sizes of 0.05 to 0.2 microns may be employed when highest density (lowest porosity) is not required.

In application Ser. No. 800,494 filed Nov. 21, 1985 is disclosed the conversion of weak, low fired material to a powder of very uniform crystal size for use in making ceramic objects by hot or cold pressing, casting, or extrusion.

EXAMPLE X

A series of abrasives of varying magnesia content were made.

The general procedures of Example I were employed, including the milling (but for 2 hours) with alumina media. In all cases the gels, after drying at 200° C. for about 30 hours, were crushed and screened and then calcined at 450° C. for 16 hours. The resulting grit sized particles were fired in a rotary kiln at 1400° C. The heat-up time to 1400° C. was about 15 minutes, and the time at 1400° C. was about 15 minutes.

Various amounts of magnesium nitrate were added prior to the gelling. In one run no magnesium nitrate was added. The MgO content and hardness of the abrasives were as follows:

| Run No. | MgO Content % by Wgt. | Hardness (Vickers 500 g load) |
| --- | --- | --- |
| 9498 | 0.14 | 19.9 |
| 9499 | 2.50 | 19 |
| 9500 | 7.95 | 19 |
| 9502 | 12.71 | 19 |

In a series of tests of vitrified (glass bonded) grinding wheels employing 54 grit (a combination of 46 grit and 60 grit sizes) sized abrasive wheels made with the above grits were compared with the highest quality known fused alumina abrasive (sulfide process abrasive).

The tests were carried out by grinding slots in tool steel (D3) at various controlled in feeds. In dry grinding, at 0.5 mils (0.0005 inches) downfeed, the abrasive containing no added MgO (0.14% MgO) had a grinding ratio 16.18 times the grinding ratio of the fused abrasive (G ratio is the volumetric ratio of material removed to wheel wear). All of the MgO additions resulted in superior performance over the fused abrasive in the dry grinding tests. In the wet grinding tests the experimental abrasives with MgO added were poorer than or equal to the fused abrasive. At 2 mils the no-magnesia-addition abrasive was superior to the fused.

In coated abrasive tests employing 50 grit size abrasive (CAMI standard) an abrasive made according to Example X, and containing 0.6% MgO, incorporated into flexible abrasive discs performed better (136%) than co-fused alumina zirconia abrasive on 1020 steel and almost equivalent to fused alumina-zirconia on stainless steel. The abrasives containing 2.5% MgO and 7.59% MgO were also superior on 1020 steel. The higher MgO addition was less effective on stainless.

The 0.14% MgO abrasive contained, in addition to the alumina: 0.25% $SiO_2$, 0.18% $Fe_2O_3$, 0.28% $TiO_2$, 0.05% CaO, and 0.04% $Na_2O$, presumably mainly introduced in the milling operation. Similar levels of these impurities were present in the other abrasives.

While applicants do not wish to be bound by any particular theory of the invention, it is believed that the introduction from the alumina media of particulate matter may effect seeding of the crystallization of alpha alumina during the firing. Additionally, the other impurities introduced in the milling step may inhibit crystal growth of the final product by their presence at grain boundaries between the alpha alumina particles.

As evidence of the fact that it is the debris from the milling media which is effective to condition the gel so that it produces the desired high density, finely crystalline, noncellular alpha alumina upon firing at about 1400° C., additions of milled water were made to alumina monohydrate together with acid, without milling of the gel.

Water, nitric acid, and microcrystalline boehmite were mixed, as in Example II, except that 6 batches were made, with varying additions of water containing the debris worn from alumina grinding media, when milled for several hours with water (no other addition to the water), as follows:

"Milled water" additions to alumina monohydrate (Condea):

| Trial | Wt. Ratio of milling debris to alumina monohydrate | Wt. % Debris in fired product* | Hardness GPa |
| --- | --- | --- | --- |
| 1. | 0.0074 | 1.07 | 20+ |
| 2. | 0.0037 | 0.53 | 20 |
| 3. | 0.0019 | 0.27 | 19+ |
| 4. | 0.00075 | 0.11 | 17 |
| 5. | 0.00038 | 0.05 | 15 |
| 6. | 0 | 0 | 12.5 |

*Note: Assuming an average loss of weight in firing of 30%.

The hardness was determined on the fired product, fired at 1400° C.±20° C., for about 10 minutes. The furnace was electrically fired, the atmosphere was air.

Examination of the milled debris showed it to be mostly alpha alumina with a surface area of about 39 square meters/gram. The optimum amount of submicron seed material (contained in the "milled water" in the above example) is 1% solids based on the total solids of the mixture. No more than about 5% of such seed material should be added since at such levels it tends to increase the crystal size and reduce the hardness of the fired product.

High purity alumina produced by recovery of the fine suspended alumina particles left in suspension when very fine alumina powders are permitted to settle after being mixed with water is also effective, when used in an amount of at least about 0.1% of the fired gel solids.

Tests with commercial fine alpha alumina powders, and tests with fine alumina generated by milling very high purity fused alumina, using such alumina itself as a milling medium, were very effective in producing the finely crystalline product of the invention. The seed material may be submicron sized alpha alumina particles or equivalent nucleation centers which produce a non-cellular submicron structures in the alumina bodies when fired for 10 minutes or less at 1400° C.

Differential thermal analysis has shown that, when the alpha alumina seed particles are present the transition of the gel alumina from presumably the gamma form to the alpha form takes place at about 1090° C., while, in the absence of such seed material the transition takes place at about 1190° C. Thus, the theoretical minimum firing temperature of the products of the present invention can be below the usual reported transformation temperature.

This invention, for the first time, permits the manufacture by low temperature sintering of high purity alpha alumina bodies having a submicron particle size and a density of greater than 95%, resulting in a hardness greater than 18 GPa. Products other than abrasive, such as coatings, thin films, fibers, rods, or small shaped parts, can be made by the process of the present invention.

Grain growth inhibitors such as $SiO_2$, $Cr_2O_3$, MgO, and $ZrO_2$ have been added to the conditioned gel. In the experiments in which MgO was added there was reaction with the alpha alumina and spinel was formed and was observed as surrounding the remaining unreacted alpha alumina. It was assumed that with the other additives compound formation with the alpha alumina was minimal and they remained in the crystal boundaries. The experiments which have been run clearly show that the crystal growth by diffusion and recrystallization was suppressed by the additives. This has value in allowing more flexibility in the time-temperature relationships for the sintered products. The use of the growth inhibitors is well known in ceramic technology and is not a necessary part of the invention but can be very useful in combination with seeding to maintain the desired microstructure over a broad range of sintering time-temperature and where the high purity of alpha alumina is not a requirement.

While polycrystalline alumina bodies may be produced by classical sintering of fine powders, such methods have not been able to produce dense bodies of equiaxed crystals having a maximum size of 0.5 microns and finer.

Prior to the present invention, polycrystalline abrasive grits of submicron alumina were unknown.

What is claimed is:

1. An alumina based sol-gel ceramic fiber wherein the alumina present as such therein consists essentially of submicron sized alpha alumina crystals, said fiber having a density of at least 95% of theoretical.

* * * * *